PHONOGRAPH PICKUP ARM AND MOUNTING

Filed June 19, 1947 2 SHEETS—SHEET 1

Inventor
Norman F. Martin
Arthur L. Knox Sr.
By Clarence J. Loftus
Atty

Nov. 25, 1952 N. F. MARTIN ET AL 2,619,352

PHONOGRAPH PICKUP ARM AND MOUNTING

Filed June 19, 1947 2 SHEETS—SHEET 2

Inventors.
Norman F. Martin
Arthur L. Knox Sr.
By: Clarence J Loftus
Atty

Patented Nov. 25, 1952

2,619,352

UNITED STATES PATENT OFFICE 2,619,352

PHONOGRAPH PICKUP ARM AND MOUNTING

Norman F. Martin and Arthur L. Knox, Sr., Fort Wayne, Ind., assignors to The Magnavox Company, Fort Wayne, Ind., a corporation of Delaware Application June 19, 1947, Serial No. 755,686

12 Claims. (Cl. 274—23)

The present invention relates to pickup arms for sound record reproducers and particularly to a novel phonograph pickup arm mounting.

Phonographs generally include a crystal pickup device or cartridge adapted to track or follow the spirally-cut sound groove in a rotating sound record and to translate the resultant vibrations into electrical undulations representative of the recorded sound. The pickup cartridge is secured to one end of a pickup arm. At or near its other end the pickup arm is pivotally mounted for swinging motion in a plane substantially parallel to the sound record disc, whereby the pickup needle may freely follow the record groove.

A pickup arm should be so mounted as to satisfy the following major requirements: First, it should provide ready and easy access to the pickup cartridge or device; second, it should have such construction and operation that a constant pressure is exerted by the pickup needle on the sound record over a reasonable range of pickup heights, that is, the pressure should be the same on a single record disc as on the top one of a stack of record discs; and third, it should maintain a constant needle pressure on any record disc being played, regardless of height variations of the surface of that record disc—that is, the pickup arm should rapidly respond to such variations.

Mechanical design considerations often preclude the mounting of a pickup arm in such a fashion that the arm and mounting can simply be lifted as a whole sufficiently high to provide ready access to the pickup cartridge. Such access is required for servicing, repair and replacement. It has been proposed that the pickup arm be hinged to the mounting at its extreme end—opposite the pickup cartridge—in order to provide this feature. However, this expedient alone does not solve the access problem because it does not provide for counterweighting action. It would manifestly be highly impracticable to permit the pickup arm to exert an uncompensated moment tending strongly to press the pickup needle into the record disc groove. Faithful sound reproduction requires that this pressure be light, uniform and delicate. It is highly desirable that these conflicting requirements of fidelity in reproduction and ready access to the pickup cartridge be reconciled.

It has been suggested that the pickup arm be hinged at a point near its end and that a tension coil spring be secured between the end and the axis on which the pickup arm rotates when traversing the record disc. This expedient has a serious disadvantage in that it prevents the maintenance of constant needle pressure over a substantial range of pickup heights. That is, the needle pressure exerted against a single isolated record disc would be different from the pressure exerted against the top one of a stack of record discs.

It has also been proposed that a flat spring be secured to the above-mentioned axis and so arranged as to urge upwardly a point on the pickup arm between the hinge and the pickup. Such an arrangement introduces friction at the point where the spring touches the pickup arm. Such friction causes undesired needle pressure variations, because a pickup arm so constructed would not move up and down as rapidly as the record disc height varies. Record discs are not perfectly flat. When the pickup arm drops, after the needle passes a raised section of the record disc, for example, this friction retards the drop, decreases needle pressure and causes inaccurate tracking and resultant lack of fidelity in reproduction.

It is, accordingly, an important object of the invention to provide a novel pickup arm and mounting having such structure and operation that the pickup cartridge may readily and easily be made available for inspection, servicing, repair or replacement.

Another primary object of the invention is to provide a novel pickup arm and mounting including means for preventing the turning moment of the pickup arm from causing excessive needle pressure on the record disc.

It is also a basic object of the invention to provide a novel pickup arm and mounting including means for maintaining the pressure of the pickup needle on a record disc constant, light, delicate and uniform, notwithstanding variations in the height of portions of the disc.

A further important object of the invention is to provide a novel pickup arm and mounting including means for maintaining the same needle pressures on a single isolated record disc as on the top one of a plurality or stack of record discs.

In general, the objects of the invention are to avoid the above-mentioned disadvantages and limitations of prior-art pickup arms and mountings.

Other and further objects and advantages of the invention will be apparent from the following description of the accompanying drawings, in which there is shown an illustrative pickup arm and mounting in accordance with the invention.

Figures 1, 2:
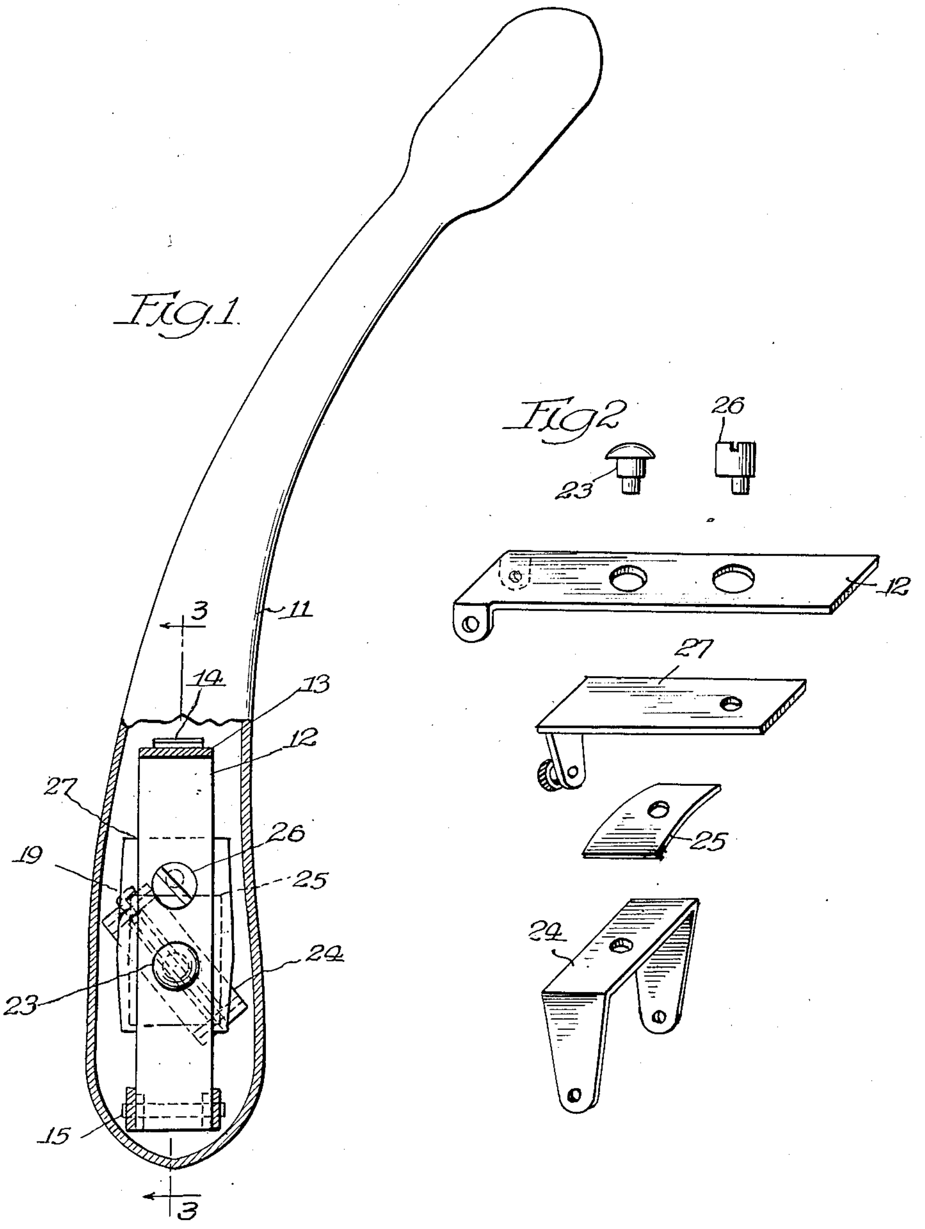
Fig. 1 is a top view thereof, parts being shown in section (Fig. 3, line 1—1)
Fig. 2 is a perspective view of parts of the mounting.

In accordance with one feature of the invention, the pickup arm body member 11 is swingably secured to a plate 12 by a pin 15 and the yoke 24 which carries the plate 12 which serves as a base member for the arm. The plate is swingably secured by a pin 18 to the bifurcations 22 of an axle 21. The pickup arm body or housing 11 may be so placed as to render the pickup readily accessible by turning it counterclockwise on pin 15 to the position shown in Fig. 4. The assembly of pickup arm body 11, plate 12 and yoke 24 is free to rotate about pin 18 when a record is being played and more specifically as the needle touches high and low points on the record disc surface, the arm 11 carries on its free end a conventional crystal pickup cartridge (not shown). The other end of the pickup arm is secured, at its base, to a plate 13, by screws 16 and rubber grommets 17. Plate 13 is formed with two integral depending lugs rotatably mounted by a pin 15 on two integral ears of plate 12. A releasable spring latch 14 is provided at the end of plate 13 opposite the lugs. This latch tightly engages the corresponding end of plate 12 when the pickup arm is in operating position.

Plate 12 is secured by a rivet 23 to a yoke 24, which yoke is hinged by a hollow pin 18 to the bifurcations 22 of the axle 21.

Figures 3, 4:
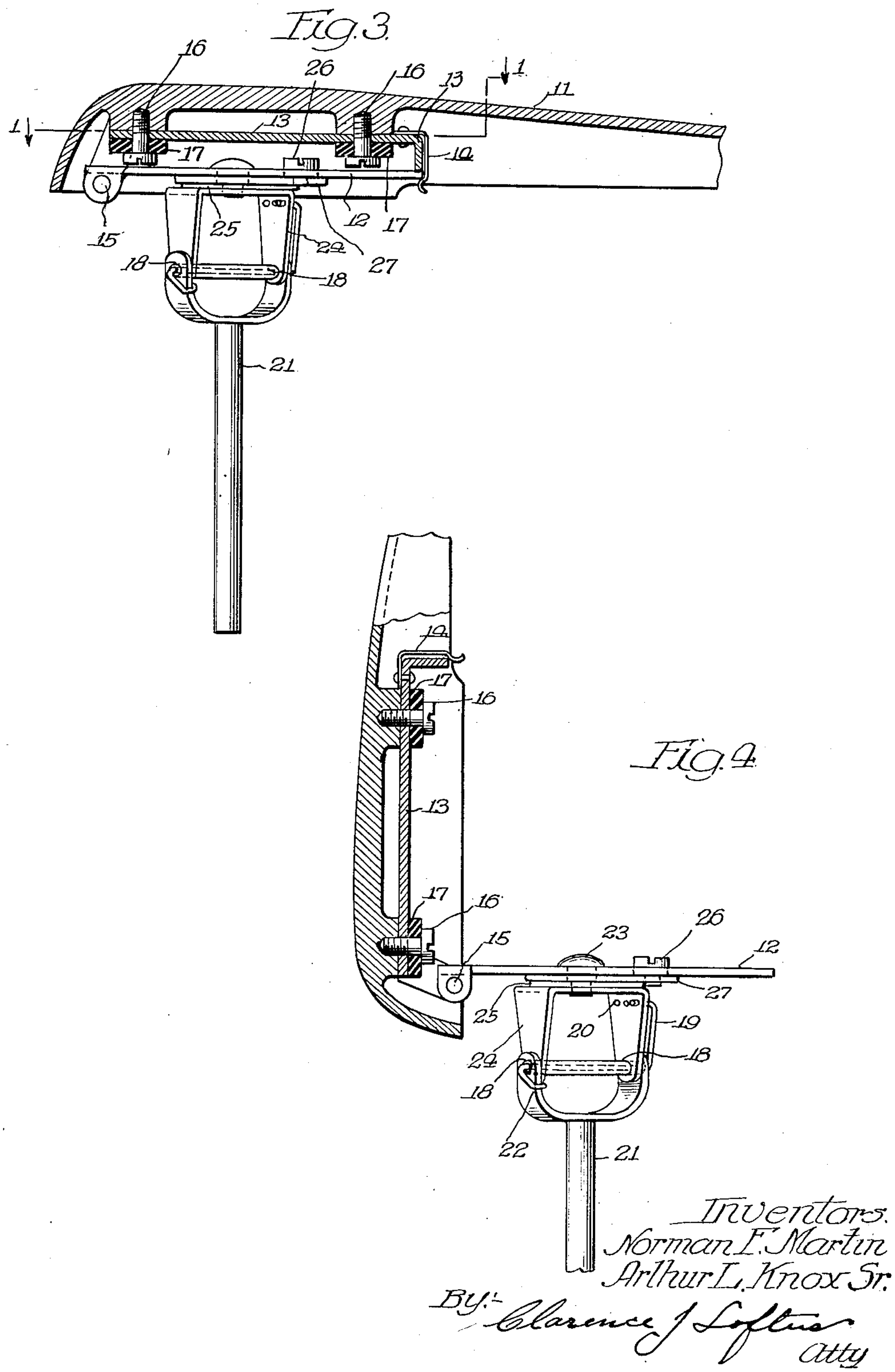
Fig. 3 is a front view, partly in section, taken along line 3—3 (Fig. 1), the pickup arm body being latched in operating position on the plate.
Fig. 4 is a front view showing the pickup arm turned upwardly to permit ready access to the pickup cartridge.

It is apparent from Fig. 3 that the mass of those portions of the pickup arm body 11, plate 12, yoke 24, and of all parts above pin 18 and to the left of the central longitudinal axis of axle 21 serves as a counter-balance to prevent excessive needle pressure that would otherwise be caused by the pickup arm portions to the right of that line. The masses are so designed that a very slight pressure is exerted by the pickup needle against a record disc.

Now let it be assumed that the top one of a stack of three record discs, say, is to be played. The center of mass of the counter-balance is above and to the left of pin 18. When the top record disc of a stack is to be played the pickup cartridge elevation is increased and the pickup arm is rotated in a counter-clockwise direction about pin 18. This causes an increase in the counterbalancing mass and would decrease the needle pressure on the record disc if it were not for another important feature of the present invention.

The counter-balancing action is obtained, not by the counter-balancing mass alone, but also by a spring 19 which is so arranged that the sum of the counter-balancing effects of the spring and the mass is maintained constant over a wide range of record disc heights, without introducing substantial undesired friction. So far as I am aware, no one has heretofore employed a spring in such a manner that it permits a wide range of pickup cartridge heights and does not introduce substantial friction or impair faithful reproduction.

One end of a spring 19 is secured in any one of the three holes 20 on one depending portion of yoke 24. The spring is bent downwardly, then inwardly through hollow pin 18 and then looped at 22 around one of the bifurcations of axle 21. The spring urges the pickup arm to turn counterclockwise. However, as the counterclockwise angular displacement of the pickup arm and the turning moment of the counterbalancing masses increase, the bias or torsional effect of the spring decreases. This decrease in the effect of spring torsion is made equal in effect to the increase in the turning moment of the counterbalancing masses, so that the sum of all factors tending to cause needle pressure against a record disc is maintained constant over a wide range of pickup cartridge heights and a wide range of record groove heights. The holes 20 provide for adjustment of the torsion of spring 19.

The whole pickup arm assembly turns on axle 21 as a record disc is played, axle 21 being appropriately journaled by conventional means well known to the art and not shown herein.

Disposed between plate 12 and yoke 24 are a spring washer 25 and a plate 27. An eccentric cam 26 has its slotted head staked to plate 27 to provide a small angular adjustment of two degrees, for example, of plate 12 relative to yoke 24, whereby the pickup arm can be set to be placed in correct playing position on record discs.

While there has been shown and described what is at present considered to be the preferred embodiment of the present invention, it will be obvious to those skilled in the art that various modifications and substitutions of equivalents may be made without departing from the teachings of the invention and the proper scope thereof and it is, accordingly, intended in the appended claims to cover all such changes and modifications as fall within the true scope of the prior art.

Having thus described our invention, we claim:

1. In a sound record reproducer, the combination of a vertically extending swivel supporting member, a pickup arm base member, a pickup arm hinged to the base member and adapted to be swung into a vertical position to provide ready access to the free end of the pickup arm, releasable means for latching the pickup arm to said base member to secure it in playing position, pivot means for mounting the base member on the swivel to provide two degrees of rotational freedom for the base member, the base member being above the pivot means and the arm extending across the pivot means so that one end of the arm exerts an increasing counterweighting effect on the other end as the arm is raised, and adjustable spring means bridging the pivot means for exerting on the pickup arm a counterbalancing force which decreases as the counterweighting force of the pickup arm increases.

2. In a phonograph pickup arm, the combination comprising a rotatable member having a vertical axis, a pickup arm support mounted on said rotatable member and having a pivoted connection therewith in a horizontal plane, a pickup arm having one end mounted on said support on a pivot displaced from said vertical axis, and a latch securing said pickup arm to said support.

3. In a phonograph pickup arm, the combination comprising a vertical shaft, a horizontal pivotal support mounted thereon, a pickup arm including a hinge connected adjacent one end thereof and to said support, said hinge being displaced from said vertical shaft, a spring latch securing said pickup arm to said support, and spring means connected between said support and said vertical shaft for producing a substantially constant counter-balancing action on the free end of said pickup arm.

4. In a sound record reproducer the combination of a pickup arm having a mounted end and a free end carrying a pickup and a mounting for so supporting said pickup arm that the pressure between said pickup and a record disc being traversed and played is substantially independent of pickup height over a wide range comprising: a yoke, means for securing said pickup arm to said yoke, an axle, pivot means securing said yoke to and above said axle to permit rotation of said pickup arm and pickup, said pickup arm including portions on one side of said pivot means which tend to press the pickup needle onto said record disc and counter-balancing portions on the other side of said pivot means, the center of mass of said counter-balancing portions being above said pivot means whereby increase in pickup height causes an increase in the counter-balancing effect of those portions, and a spring connected between said yoke and axle for urging said pickup needle away from said record disc, said spring having such tension that the force thereof decreases as said counter-balancing effect increases, whereby said pressure is maintained constant over a wide range of pickup heights.

5. In a sound record reproducer, the combination of a vertically extending swivel supporting member, a pickup arm base member, a pickup arm hinged to the base member and adapted to be swung into a vertical position to provide ready access to the free end of the pickup arm, pivot means connecting the base member and the swivel supporting member, the base member being above the pivot means and the arm extending across the pivot means so that one end of the arm exerts an increasing counterweighting effect on the other end as it is raised, and adjustable spring means bridging the pivot means and the swivel supporting member for exerting on the pickup arm a counterbalancing force which decreases as the counterweighting force of the pickup arm increases.

6. In a sound record reproducer, the combination of a vertically extending swivel supporting member, a pickup arm, pivot means on said supporting member for mounting the pickup arm on and above said swivel with the arm extending across the pivot means so that one end of the arm exerts an increasing counterweighting effect on the other end as it is raised, and spring means bridging the pivot means and the supporting member for exerting on the pickup arm a counterbalancing force which decreases as the counterweighting force of the pickup arm increases.

7. In a sound record reproducer, the combination of a pickup arm, pivot means on the pickup arm for mounting the pickup arm for vertical and horizontal movement, the pickup arm being above the pivot means and extending across the pivot means so that one end of the arm exerts an increasing counterweighting effect on the other end as it is raised, and spring means operatively associated with the pivot means for exerting on the pickup arm a counterbalancing force which decreases as the counterweighting force of the pickup arm increases.

8. In a sound record reproducer, the combination of a pickup arm, pivot means on the pickup arm for mounting the pickup arm for vertical and horizontal movement, the pickup arm being above the pivot means and extending across the pivot means so that one end of the arm exerts an increasing counterweighting effect on the other end as it is raised, and spring means connected between the pivot means and the pickup arm for exerting on the pickup arm a counterbalancing force which decreases as the counterweighting force of the pickup arm increases.

9. In a sound record reproducer, the combination of a vertically extending swivel supporting member, a pickup arm base member, a pickup arm hinged to the base member and adapted to be swung into a vertical position to provide ready access to the free end of the pickup arm, releasable means on said pickup arm for latching the pickup arm to said base member to secure it in playing position and pivot means for mounting the base member on the swivel to provide two degrees of horizontal rotational freedom for the base member.

10. In a sound record reproducer, the combination of a swivel supporting member, a pickup arm base member, a pickup arm mounted on the base member and cam means between the base member and the swivel for mounting the base member on the swivel to provide two degrees of horizontal rotational freedom for the base member.

11. In a sound record reproducer, the combination of a swivel supporting member, a pickup arm base member mounted on said supporting member, a pickup arm hinged to the base member and adapted to be swung into a vertical position to provide ready access to the free end of the pickup arm and releasable means for latching the pickup arm to said base member to secure it in playing position.

12. In a sound record reproducer, the combination of a swivel supporting member, a pickup arm base member, a pickup arm movably mounted on the base member and adapted to be moved into a vertical position to provide ready access to the free end of the pickup arm, releasable means for latching the pickup arm to said base member to secure it in playing position, and means for movably mounting the base member on the swivel to provide two degrees of horizontal rotational freedom for the base member.

NORMAN F. MARTIN.
ARTHUR L. KNOX, Sr.

REFERENCES CITED

The following references are of record in the file of this patent:

UNITED STATES PATENTS

| Number | Name | Date |
|---|---|---|
| 531,690 | McKelvey | Jan. 1, 1895 |
| 842,897 | Macdonald | Feb. 5, 1907 |
| 1,067,530 | Lindstrom | July 15, 1913 |
| 1,881,942 | Raber | Oct. 11, 1932 |
| 1,908,738 | Eaton | May 16, 1933 |
| 2,246,130 | Forstrom | June 17, 1941 |
| 2,271,039 | Slade et al. | Jan. 27, 1942 |
| 2,331,122 | Jones | Oct. 5, 1943 |
| 2,351,948 | Gay | June 20, 1944 |
| 2,351,972 | Johnson | June 20, 1944 |
| 2,363,655 | Dally | Nov. 28, 1944 |
| 2,368,198 | Brown et al. | Jan. 30, 1945 |
| 2,375,658 | Johnson | May 8, 1945 |
| 2,434,033 | Cain | Jan. 6, 1948 |
| 2,551,506 | Rockwell | May 1, 1951 |

FOREIGN PATENTS

| Number | Country | Date |
|---|---|---|
| 728,245 | France | Apr. 11, 1932 |